United States Patent
Han (10) Patent No.: US 8,880,028 B2
(45) Date of Patent: Nov. 4, 2014

(54) NEAR FIELD COMMUNICATION (NFC) ACCESSORY PROVIDING ENHANCED DATA TRANSFER FEATURES AND RELATED METHODS

(75) Inventor: Dian Ping Han, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 197 days.

(21) Appl. No.: 13/368,830

(22) Filed: Feb. 8, 2012

(65) Prior Publication Data

US 2013/0203346 A1 Aug. 8, 2013

(51) Int. Cl.
*H04M 1/66* (2006.01)
*H04M 1/68* (2006.01)
*H04M 3/16* (2006.01)

(52) U.S. Cl.
USPC ......... 455/411; 455/41.1; 455/41.2; 370/439; 235/492

(58) Field of Classification Search
USPC ............. 455/41.1–41.3, 411, 575.6; 370/439; 235/492
See application file for complete search history.

(56) References Cited

U.S. PATENT DOCUMENTS 7,128,274 B2 * 10/2006 Kelley et al. ................... 235/492
8,055,187 B2 * 11/2011 Tanabe .......................... 455/3.05
2008/0219227 A1 9/2008 Michaelis
2009/0144550 A1 6/2009 Arunan
2010/0079414 A1 4/2010 Ferlitsch
2010/0121726 A1 5/2010 Coulter et al.
2013/0132282 A1 * 5/2013 Shakkarwar ................... 705/64

FOREIGN PATENT DOCUMENTS

EP 1901203 3/2008
WO 2006100171 9/2006

OTHER PUBLICATIONS

"Near Field Communication in the real world Turning the NFC promise into profitable, everyday applications" http://www.nfcforum org/resources/white_papers/Innovision_whitePaper1.pdf, 2010, pp. 1-13.
Van't Hof et al. "Convenience takes a great step forward. But what about the footprints we leave?" Near Field Communication http://www.cvth.nl/nfc1.pdf Oct. 14, 2008.
Galaxytabs: www.galaxytabs.com/tag/stylus; printed Jan. 9, 2011.
Technology Review "Latest Gadget for iPhone, iPad, Blackberry, HTC + more" www.mrmobile.net.au, printed Jan. 9, 2011.

* cited by examiner

*Primary Examiner* — Tuan H Nguyen
(74) *Attorney, Agent, or Firm* — Allen, Dyer, Doppelt, Milbrath & Gilchrist, P.A.

(57) ABSTRACT

An electronics system may include at least one first near field communication (NFC) device, a second NFC device capable of storing data, and an NFC accessory. The NFC accessory may be capable of receiving the data from the second NFC device via NFC communication, sending the copied data to the at least one first NFC device via NFC communication, and deleting the data after providing the data to the at least one first NFC device.

23 Claims, 6 Drawing Sheets

NEAR FIELD COMMUNICATION (NFC) ACCESSORY PROVIDING ENHANCED DATA TRANSFER FEATURES AND RELATED METHODS

TECHNICAL FIELD

This application relates to the field of communications, and more particularly, to electronic devices and related methods that use near field communication (NFC).

BACKGROUND

Some electronic and other device incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, an electronics system is provided herein which may include at least one first near field communication (NFC) device, a second NFC device capable of storing data, and an NFC accessory. The NFC accessory may be capable of receiving the data from the second NFC device via NFC communication, sending the data to the at least one first NFC device via NFC communication, and deleting the data after providing the data to the at least one first NFC device. As such, the NFC accessory may advantageously provide for the convenient transfer of data between different NFC devices, yet while providing enhanced security, for example.

More particularly, the NFC accessory may comprise an elongate housing, and an NFC transceiver carried by the elongate housing. By way of example, the elongate housing may have a pointed tip so that the NFC accessory defines a stylus. The NFC accessory may also comprise a memory coupled with the NFC transceiver, and at least one battery coupled with the NFC transceiver and the memory. Moreover, the NFC accessory may further comprise a switch capable of selectively coupling the at least one battery to the NFC transceiver and the memory.

The NFC accessory may further include an input device capable of receiving an input for causing the device to delete the data. In addition, the NFC accessory may comprise a timer capable of deleting the copied data after a timeout period. By way of example, the at least one first NFC device may comprise at least one mobile communications device, and the second NFC device may comprise an NFC tag.

A related NFC accessory, such as the one described briefly above, and a related NFC method are also provided. The method may include sending the data from the second NFC device to a NFC accessory via NFC communication, sending the copied data from the NFC accessory to the at least one first NFC device via NFC communication, and deleting the data from the NFC accessory after providing the data to the at least one first NFC device.

A related non-transitory computer-readable medium is also provided. The non-transitory computer-readable medium may have computer executable instructions for causing an NFC accessory to perform steps including receiving data from a second NFC device to an NFC accessory via NFC communication, sending the data from the NFC accessory to the at least one first NFC device via NFC communication, and deleting the data from the NFC accessory after sending the data to the at least one first NFC device.

Figure 1:
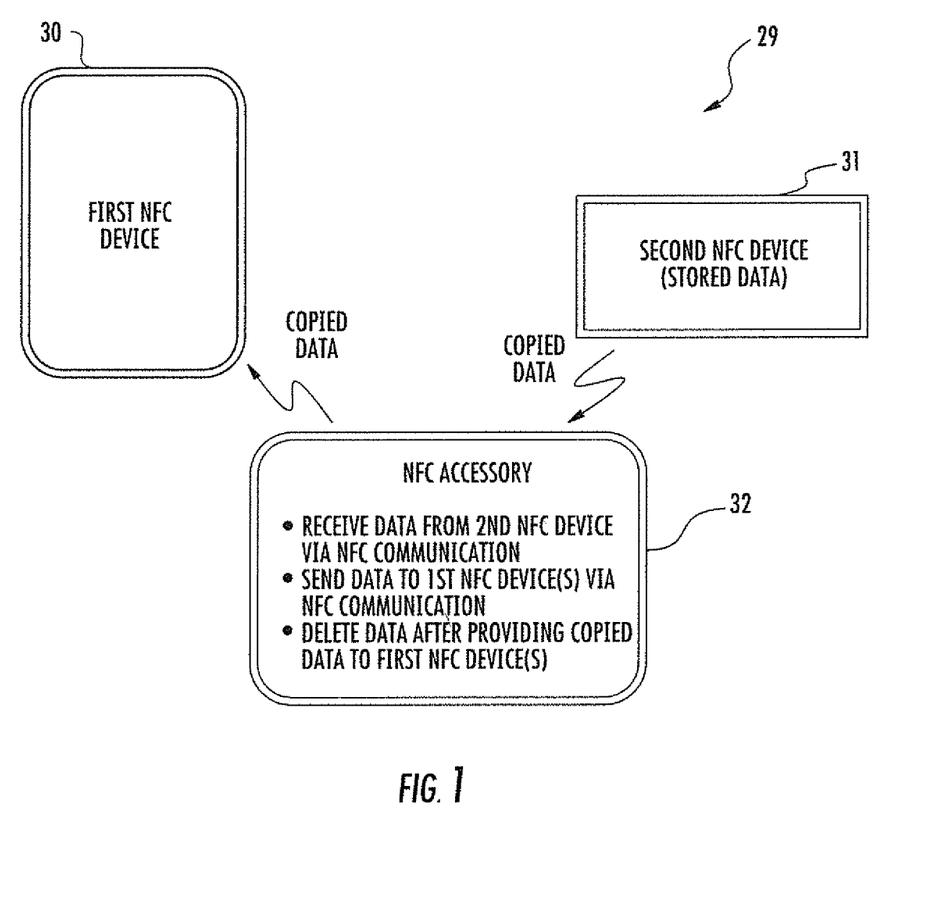
FIG. 1 is a schematic block diagram of an electronics system in accordance with one example embodiment.

Referring initially to FIG. 1, an electronics system 29 illustratively includes one or more first near field communication (NFC) devices 30, a second NFC device 31 capable of storing data (i.e., it may include one or more memories for storing data), and a NFC accessory 32. By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of several centimeters (typically up to about 4 cm, or up to about 10 cm, depending upon the given implementation), but other suitable versions of near field communication which may have different operating frequencies, effective ranges, etc., for example, may also be used.

The one or more first NFC device 30 and the second NFC device 31 may take various forms, such as an NFC reader (e.g., an NFC security card reader or payment card reader, etc.), a NFC tag (e.g., a smart poster tag), as well as electronic devices such as computers or mobile communications devices (also referred to as a "mobile device" herein). Example mobile devices 31 may include portable or personal media players (e.g., music or MP3 players, video players, electronic book readers, etc.), portable gaming devices, portable or mobile telephones, smartphones, portable computers such as tablet computers and laptop computers, digital cameras, etc. Other types of NFC devices may include appliances, stereos, televisions, desktop computers, garage door openers, or other objects, and such objects need not necessarily be electrical or electronic devices. Moreover, it should also be noted that such devices need not necessarily have NFC functionality built in, rather they may be considered as a NFC device when a smart poster tag, etc., is positioned thereon.

In some circumstances it may be difficult, inconvenient, or awkward to physically swipe or position different types of devices in close proximity with one another. For example, for an NFC-enabled tablet computer, it may be relatively cumbersome to hold the tablet computer up to a wall to swipe an NFC tag, as this may require a user to set down other objects and use both hands to lift and hold the tablet computer up. In other circumstances, it may not be convenient for a user to swipe a mobile phone with a smart poster tag or reader terminal, for example, while on a phone call. Here again, it should be noted that, as used herein, an "NFC device" need not be a mobile electronic device, but may instead be an object such as a television, stereo, refrigerator, smart home appliance, etc., that may otherwise be difficult or inconvenience to reach with another NFC-enabled device, such as a tablet computer.

Figure 2:
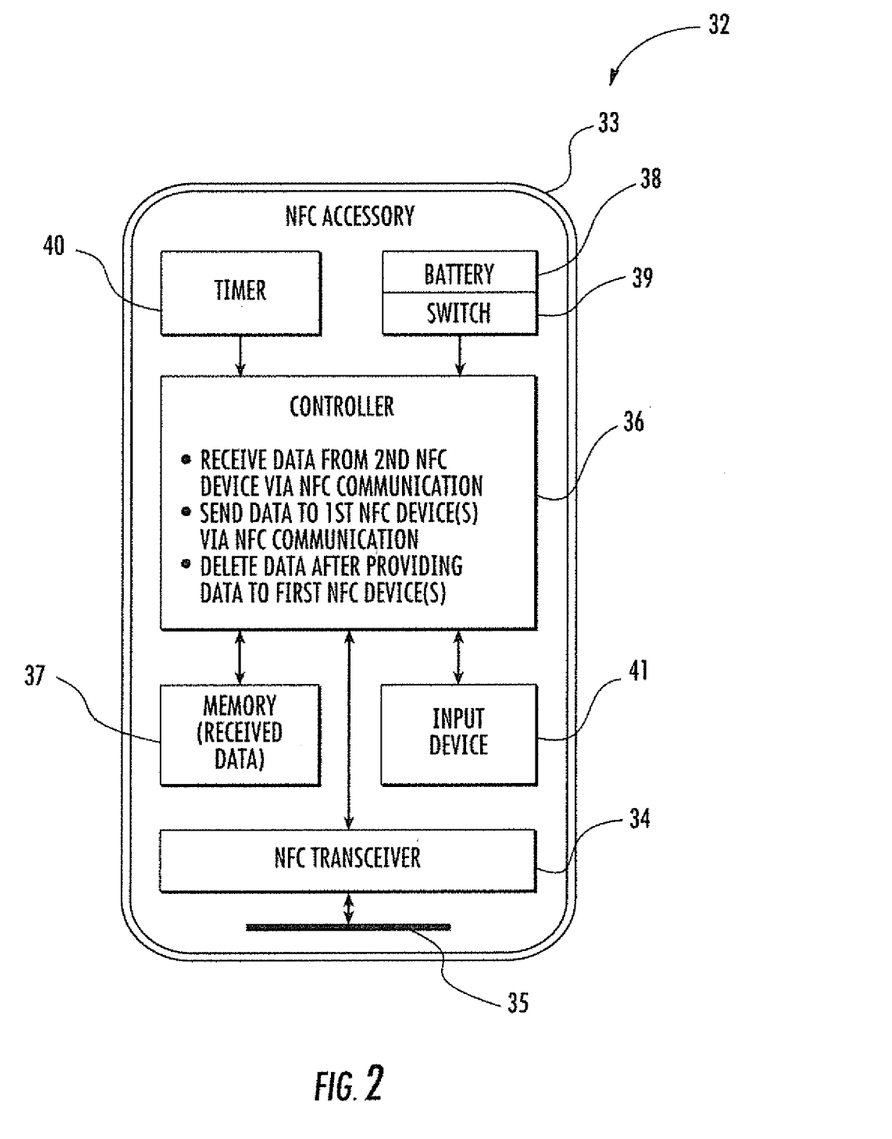
FIG. 2 is a schematic block diagram of an example embodiment of the NFC accessory of the system of FIG. 1.

To advantageously address these and other similar situations where it may be inconvenient or impractical to swipe the first NFC device 30 with the second NFC device 31, the NFC accessory 32 may include a token or other object that advantageously acts as an intermediate or intermediary "go-between" to copy or transfer data between the different NFC devices. Referring additionally to FIG. 2, in one example embodiment the NFC accessory 32 illustratively includes a housing 33, an NFC transceiver 34 and associated NFC antenna 35, a controller 36 coupled with the NFC transceiver 34, and a memory 37 coupled with the controller 36. By way of example, the NFC transceiver 34, the antenna 35, the controller 36, and the memory 37 may be implemented as part of an NFC chipset. In some embodiments, the memory 37 may be configured as a secure element, although a secure memory configuration need not be used in all embodiments (or both types may be used). Generally speaking, a trusted service manager (TSM) is used to write or modify data in a NFC secure element. Thus, for typical data exchanges between NFC devices, a memory 37 which is not configured as a secure element may be used, although the data transfer and delete operations described herein may also be used with a secure element in some instances (such as when the NFC accessory 32 is used as an intermediary to a TSM provisioning terminal at a bank, etc.). In such embodiments, the NFC accessory 32 may be configured as a trusted device which is paired with the first NFC device 30 or the second NFC device 31.

The controller 36 may be implemented using a combination of hardware (e.g., microprocessor, logic circuitry, etc.) and a non-transitory computer-readable medium having computer-executable instructions for performing the various operations noted herein. The NFC accessory 32 in some embodiments may further include one or more batteries 38 and an associated switch 39 for coupling the battery to the other components of the NFC accessory 32. The NFC accessory 32 also optionally includes a timer 40 coupled with the controller 36, and an input device 41 also coupled with the controller.

Figure 5:
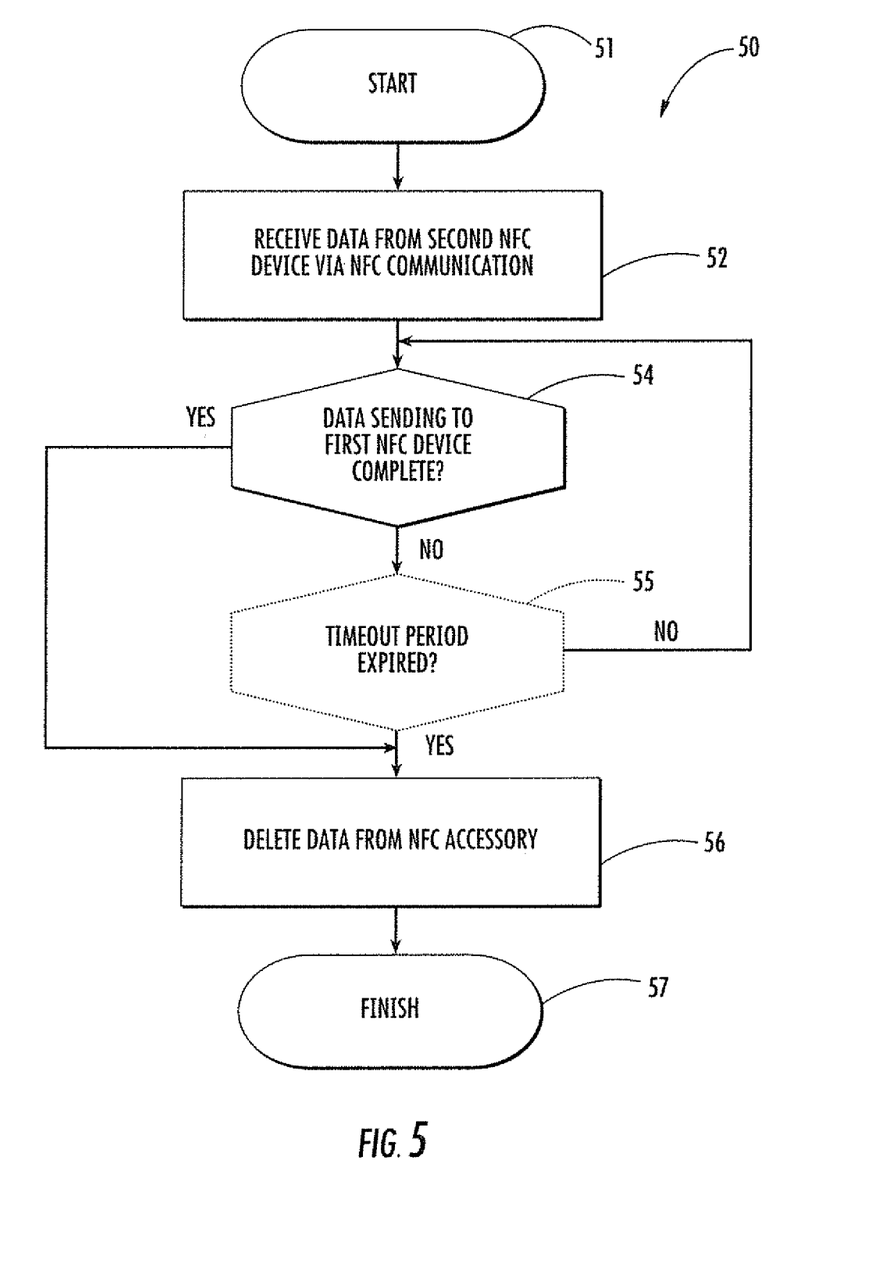
FIG. 5 is a flow diagram illustrating method aspects associated with the system of FIG. 1.

Referring additionally to the flow diagram 50 of FIG. 5, beginning at Block 51, the NFC accessory 32 may be capable of receiving or copying data from the second NFC device 31 to the memory 37 via NFC communication, at Block 52, and sending or providing the copied data to the first NFC device 30 via NFC communication. After the copied data has been sent to the first NFC device 30, the controller 36 is further capable of or configured to delete or purge the copied data from the memory 37. As such, the NFC accessory 32 may advantageously provide for the convenient transfer of data between different NFC devices, yet while providing enhanced security, for example. That is, an enhanced level of security may be provided for the transfer of private or sensitive data as the NFC accessory 32 may advantageously purge or delete this information from the memory 37 upon completion of the data copy or transfer operation. Thus, a subsequent loss or theft of the NFC accessory 32 would not result in a loss or compromise of the private or sensitive data.

It should be noted that not all data need be deleted from the memory 37 after each transfer. For example, an option may be provided to retain certain persistent data for an extended period, such as an electronic business card for the owner of the NFC accessory 32, for example. That is, the memory 37 and controller 36 may be capable of selectively retaining some data following data transfers, while retaining other data that a user desires to keep for a longer period of time. The selective deleting of data may also be performed based upon data type. For example, copied data of a type that is considered to be secure (e.g., device MAC addresses, financial transaction data, etc.) may be automatically deleted upon completion of being provided to the first NFC device 30, while less sensitive data (e.g., URLs) may be permitted to remain in the memory 37 after being provided to the first NFC device 30 (e.g., until the memory 37 gets full and data needs to be overwritten, etc.).

Figure 3:
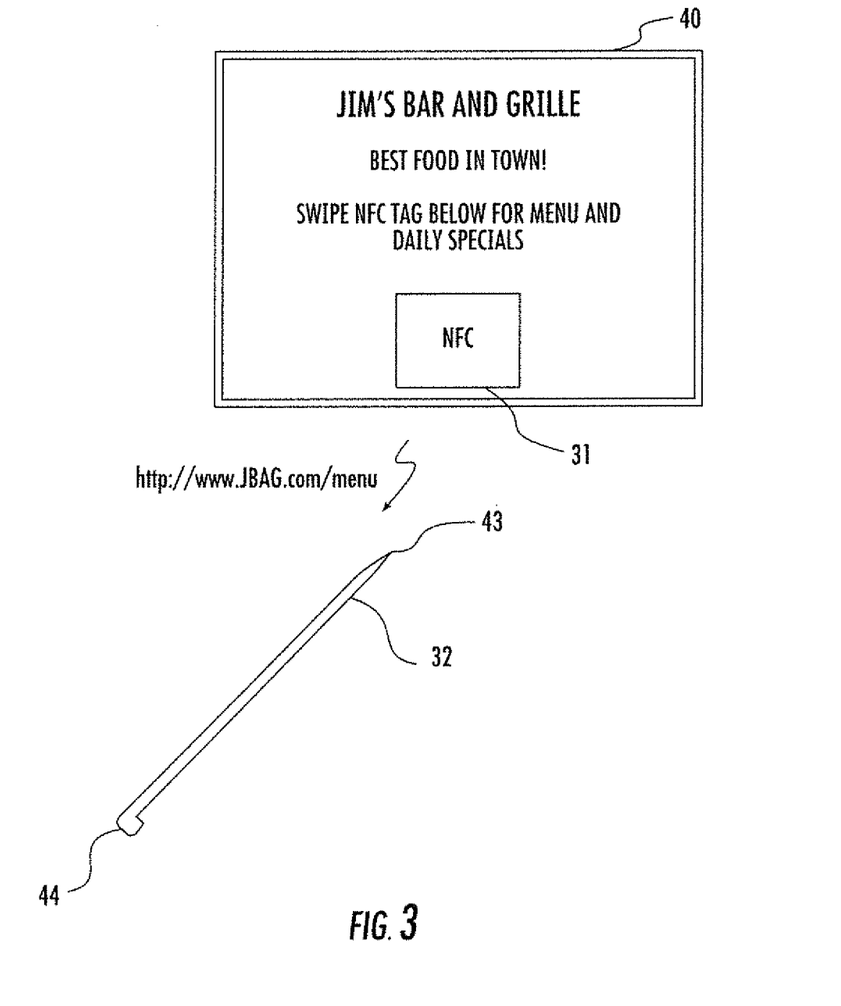
FIGS. 3 and 4 are schematic diagrams illustrating operation of the NFC devices and NFC accessory of the system of FIG. 1 in accordance with an example embodiment.
Figure 4:
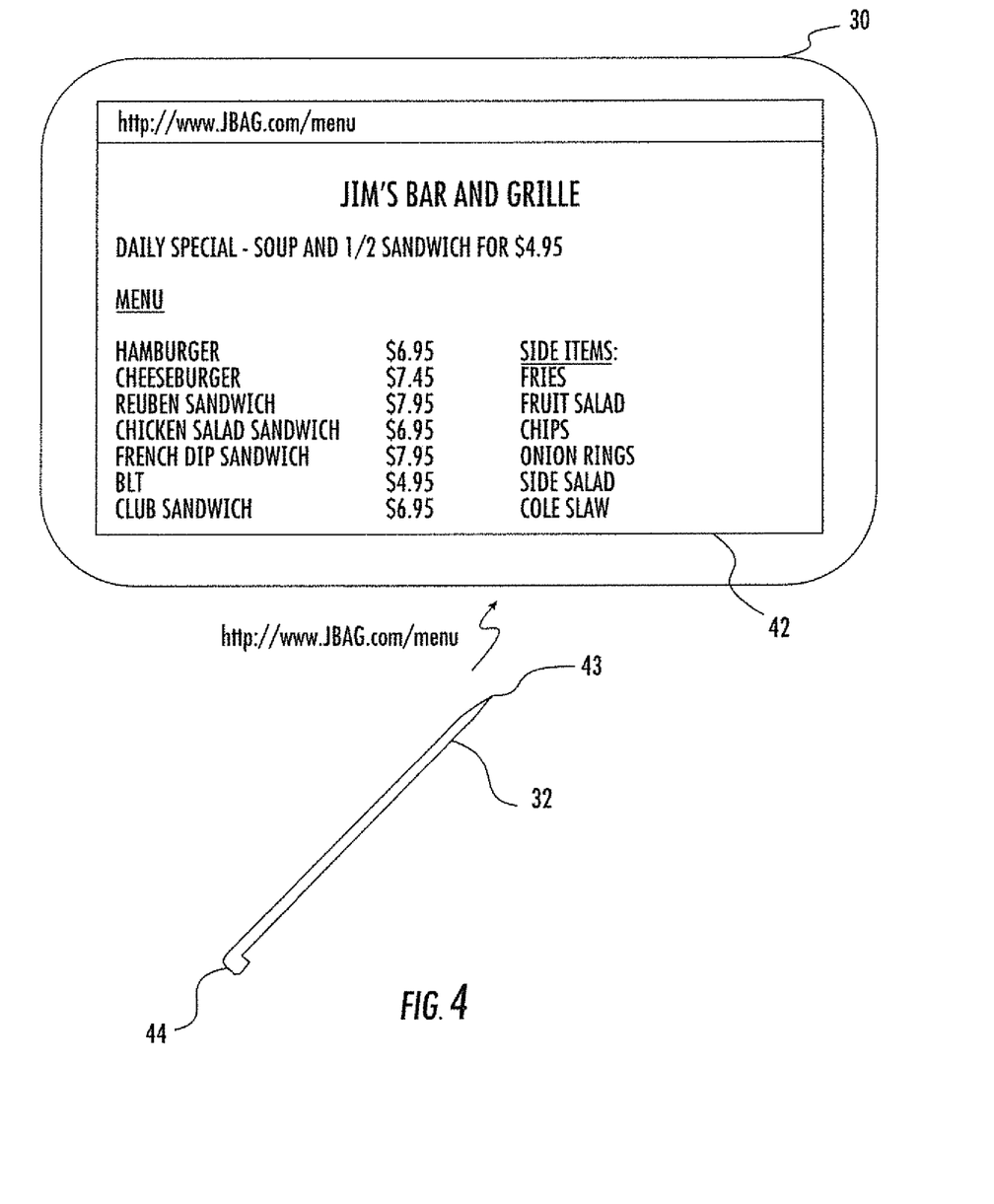

The foregoing will be further understood with reference to the example set forth in FIGS. 3 and 4. Here, the NFC accessory 32 has an elongated housing and a tip to define a stylus. In this regard, the stylus may appear as a "magic wand" that transfers data by tapping or swiping with one NFC device and then another NFC device. The stylus may be an accessory for the first NFC device, which in this example comprises a tablet computer. For example, in addition to transferring data to the first NFC device, the NFC accessory 32 may also be used for writing on a display 42 of the first NFC device 30. In some embodiments, the first NFC device 30 may include a holder for the NFC accessory 32. It should be noted that the NFC accessory 32 may have other form factors than a stylus in different embodiments. For example, the NFC accessory 32 may be in the shape of a card (e.g., similar to a business card or payment card), or may be implemented in other form factors such as a wallet, a key ring, fob, a mobile device, etc.

For NFC accessories 32, such as a stylus with a relatively small and convenient form factor, the battery 38 of the NFC accessory may comprise one or more small battery cells, such as button battery cells (which may also be referred to as coin or watch battery cells). Moreover, since the stylus resembles a pen shape, the switch 39 may be a push button switch on an end 44 of the stylus opposite the point 43, although other types and locations of the switch 39 may be used. In this way, the switch 39 may be pressed when it is desired to perform an NFC data transfer, which provides power from the battery 38 to the NFC transceiver 34, the controller 36, and the memory 37 to place the NFC accessory 32 in an appropriate mode (e.g., peer-to-peer (P2P) or read/write (R/W)) in which is will begin to scan for another NFC device, such as the second NFC device 31. It should be noted, however, that the NFC accessory 32 need not include the battery 38 and switch 39 in some embodiments. That is, the NFC accessory 33 may be a passive device which operates in a card emulation (CE) mode, for example, and is powered by the field generated by an active NFC reader terminal, for example. Moreover, in some embodiments the controller 36 may selectively operate the NFC transceiver 34 in all of the above-noted modes (i.e., it may switch between one or more of P2P, R/W, and CE modes).

In the present example, the second NFC device 31 comprises a passive, smart poster NFC tag associated with a sign 40 for a restaurant named Jim's Bar and Grille. The sign 40 advises users to swipe the second NFC device 31 to obtain menu and daily special information for the restaurant. As such, the switch 39 may be pressed to "wake up" the controller 36 and place the NFC transceiver 34 in an active mode, so that when it is swiped with or moved in proximity to the second NFC device 31, it will provide a field that powers the NFC device so that the NFC device will send the data stored thereon. In this case, the data comprises a hyperlink or uniform resource locator (URL) to a page on a website for the restaurant (i.e., "http://www.JBAG.com/menu") that includes the menu and daily special information. The hyperlink is copied and stored in the memory 37. However, it should be noted that other types of data may be copied in other embodiments, such as electronic files (e.g., pictures, documents, music, videos, text, etc.), payment data, etc. Also, the data copied from the second NFC device 31 may include connectivity information for establishing a separate wireless connection (e.g., Bluetooth, wireless LAN, personal area network (PAN), Zigbee, TransferJet, etc.) directly between the first NFC device 30 and the second NFC device 31. Other example data that may be passed by the NFC accessory 32 includes security or credential data, such as for logging onto a computer, Website, etc. In some instances, the first NFC device 30 and the second NFC device 31 may be devices typically not considered as readily portable (e.g., desktop computers, servers, etc.), and the NFC accessory 32 may advantageously provide for a convenient transfer of data between such devices.

Accordingly, when the NFC accessory 32 is swiped, bumped, or otherwise brought in proximity to the first NFC device 30 (i.e., the tablet computer), the data that was copied into the memory 37 (i.e., the hyperlink) is sent or provided to the first NFC device 30. This causes the first NFC device 30 to display the website page associated with the hyperlink in a browser window on the display 42, as seen in FIG. 4. As a result, the user of the first NFC device 30, which is shown as a tablet computer in this example, does not have to physically move the tablet computer in front of the second NFC device 31, but instead may easily and conveniently move the relatively small and lightweight stylus between the second NFC device 31 and the first NFC device 30.

Upon completion of sending or providing the data to the first NFC device 30, the copied data may advantageously be deleted from the memory 37, at Block 56, concluding the method illustrated in FIG. 5 (Block 57). This may be particularly advantageous in that it may keep others from obtaining sensitive or personal data if the NFC accessory 32 is lost or stolen. For example, this may be beneficial if the NFC accessory 32 is used for payment transactions, such as to transfer payment information between the first NFC device 30 and the second NFC device 31, such as in a point-of-sale (POS) application. Deleting of the data may be accomplished in various ways. For example, the first NFC device 30 may notify or instruct the controller 36 when the data transfer is completed (Block 54), and the controller may be configured or programmed to delete or delete the data from the memory 37 responsive to this notification or instruction.

In another example, the controller 36 may determine when the data transfer is complete and initiate the data delete of the memory 37 on its own. In accordance with another example, the data may be deleted responsive to user input. For example, the switch 39 may be actuated to power off the NFC accessory 32 after swiping with the first NFC device 30, and the controller 36 may delete the memory 37 responsive to this actuation of the switch 39. Similarly, in embodiments where the separate input device 41 is included, the input device may be used to prompt the controller 36 to delete the memory 37, for example. The input device 41 may comprise a button switch or other suitable types of switches, for example.

In accordance with another advantageous aspect, in embodiments where the timer 40 is included, the controller 36 may cause the data stored in the memory 37 to be deleted after a timeout period, at Block 55. This data delete may occur irrespective of whether the data has been successfully transferred to the first NFC device 30 or not. That is, a user may be given a certain amount of time to complete the data transfer, after which the data will be deleted. Here again, this may be advantageous with respect to security and privacy, in that sensitive or private data will be deleted within the timeout period so that loss or theft of the NFC accessory 42 is less likely to result in exposure of the data. The timeout period may also be used to shut down the NFC accessory 32 to conserve battery 38 power. In the case of a volatile memory 37, the timeout shutdown of the NFC accessory 32 would also result in deleting of the memory 37 (i.e., by removing its power).

It should be noted that in some embodiments the NFC accessory 32 may transfer the copied data to more than one first NFC device 30 before the data is deleted from the memory 37. For example, the NFC accessory 32 may be used to exchange an electronic business or contact card to multiple NFC-enabled devices during a meeting before deleting. Furthermore, the NFC accessory 32 may also be used to copy data from multiple second NFC devices 31, and provide the copied data to one or more first NFC devices 30. In addition, the NFC accessory 32 may also be used to pass information back to one or more second NFC devices 31, either before or after deleting of the original copied data from the second NFC device from the memory 37.

In some embodiments, the NFC accessory 32 processes the data received from the second NFC device 31 before the NFC accessory 32 sends the data to the first NFC device 30. The processing of the data may include filtering a portion of the data (for example, removing malicious links). The processing of the data may include determining whether the first NFC device 30 is permitted to obtain the data as per a security policy.

Example components of a mobile wireless communications device 1000 that may be used in accordance with the above-described embodiments are further described below with reference to FIG. 6. The device 1000 illustratively includes a housing 1200, an optional keyboard or keypad 1400 and an output device 1600. The output device shown is a display 1600, which may include a full graphic LCD. In some embodiments, the display 1600 may have an array of touch sensors associated therewith to define a touch screen that may be used an input device. Various types of display technologies may be used, including three-dimensional (3D) displays, in some embodiments. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
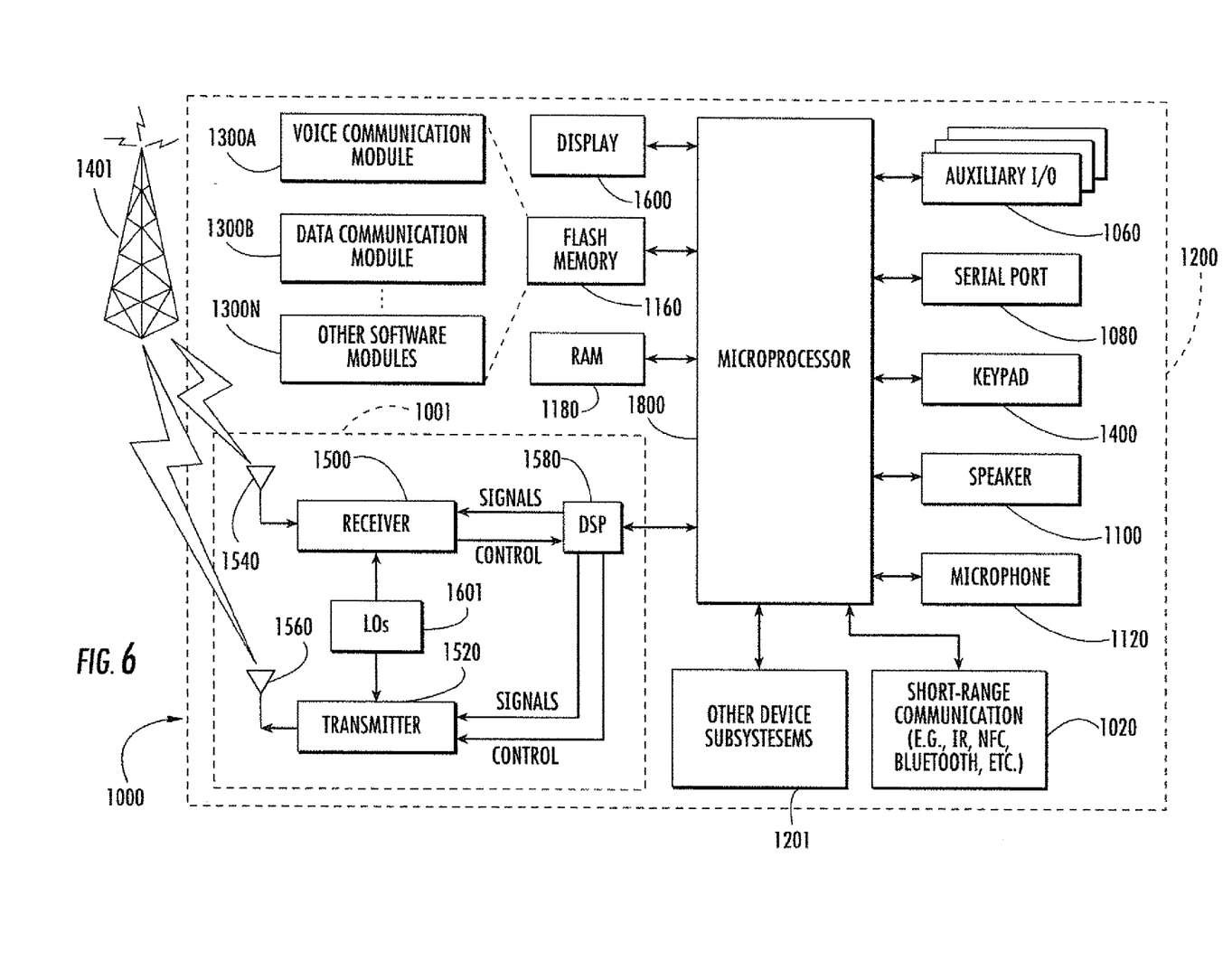
FIG. 6 is a schematic diagram illustrating example components that may be used with the NFC devices or NFC accessory of FIGS. 1-4.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may include a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOS) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, wireless local area network (WLAN) or WiFi, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) communications module for communicating with a NFC device or NFC tag via NFC communications. Other short-range modules may includes a radio frequency identification (RFID) module, a TransferJet module, etc.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. An electronics system including: at least one first near field communication (NFC) device; a second NFC device capable of storing data; and a NFC accessory comprising a timer and being capable of receiving the data from the second NFC device via NFC communication, sending the data to the at least one first NFC device via NFC communication, and deleting the data after sending the data to the at least one first NFC device and after a timeout period based upon said timer.

2. The electronics system of claim 1 wherein the NFC accessory includes:

an elongate housing; and a NFC transceiver carried by the elongate housing.

3. The electronics system of claim 2 wherein the elongate housing has a pointed tip so that the NFC accessory defines a stylus.

4. The electronics system of claim 1 wherein the NFC accessory includes:

a NFC transceiver;

a memory coupled with the NFC transceiver; and at least one battery coupled with the NFC transceiver.

5. The electronics system of claim 4 wherein the NFC accessory further includes a switch capable of selectively coupling the at least one battery to the NFC transceiver.

6. The electronics system of claim 1 wherein the NFC accessory further includes an input device capable of receiving an input for causing the device to delete the data.

7. The electronics system of claim 1 wherein the at least one first NFC device includes at least one mobile communications device.

8. The electronics system of claim 1 wherein the second NFC device includes an NFC tag.

9. The electronics device of claim 1 wherein the NFC accessory is operable in a read/write (R/W) mode.

10. A NFC accessory including: a memory; a timer; a NFC transceiver coupled with the memory and capable of communicating with at least one first NFC device and a second NFC device via NFC communication; and a controller coupled with the memory and timer and the NFC transceiver, the controller being capable of receiving data from the second NFC device to the memory via NFC communication, sending the data from the memory to the at least one first NFC device via NFC communication, and deleting the data from the memory after sending the data to the at least one first NFC device and after a timeout period based upon said timer.

11. The NFC accessory of claim 10 further including an elongate housing carrying said memory and said NFC transceiver.

12. The NFC accessory of claim 11 wherein the elongate housing has a pointed tip to define a stylus.

13. The NFC accessory of claim 10 further including at least one battery coupled with the NFC transceiver.

14. The NFC accessory of claim 13 further including a switch capable of selectively coupling the at least one battery to the NFC transceiver.

15. The NFC accessory of claim 10 further including an input device capable of receiving an input for causing the controller to delete the copied data from the memory.

16. A method for using a near-field communication (NFC) accessory with at least one first near field communication (NFC) device and a second NFC device capable of storing data, the method including comprising: receiving the data from the second NFC device at the NFC accessory via NFC communication; sending the data from the NFC accessory to the at least one first NFC device via NFC communication; and deleting the data from the NFC accessory after sending the data to the at least one first NFC device and after a timeout period.

17. The method of claim 16 wherein the NFC accessory includes an elongate housing and an NFC transceiver carried by the elongate housing.

18. The method of claim 16 wherein the NFC accessory includes a NFC transceiver, a memory coupled with the NFC transceiver, and at least one battery coupled with the NFC transceiver.

19. The method of claim 16 wherein the NFC accessory further includes an input device capable of receiving an input for causing the NFC device to delete the data.

20. A non-transitory computer-readable medium having computer executable instructions for causing a near field communication (NFC) accessory to perform steps comprising: receiving data from a second NFC device via NFC communication; sending the data from the NFC accessory to the at least one first NFC device via NFC communication; and deleting the copied data from the NFC accessory after sending the data to the at least one first NFC device and after a timeout period.

21. The non-transitory computer-readable medium of claim 20 wherein the NFC accessory comprises an elongate housing and an NFC transceiver carried by the elongate housing.

22. The non-transitory computer-readable medium of claim 20 wherein the NFC accessory comprises a NFC transceiver, a memory coupled with the NFC transceiver, and at least one battery coupled with the NFC transceiver and the memory.

23. The non-transitory computer-readable medium of claim 20 further comprising receiving an input from an input device for causing the NEC device to delete the data.

* * * * *